March 29, 1927.
J. SMITH
DRY CELL OR BATTERY
Filed Sept. 9, 1921
1,622,402
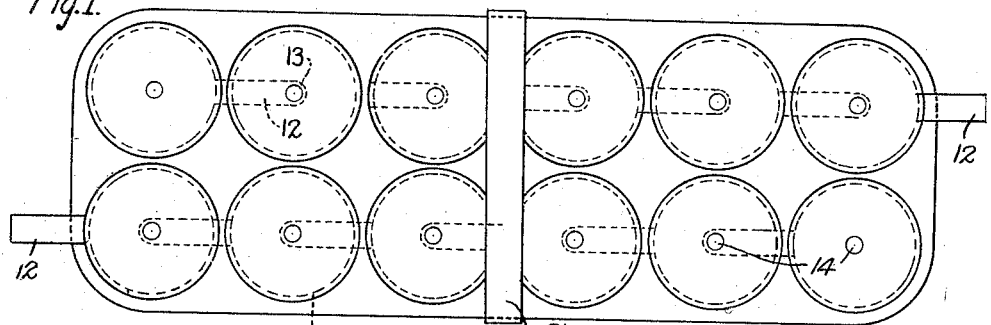
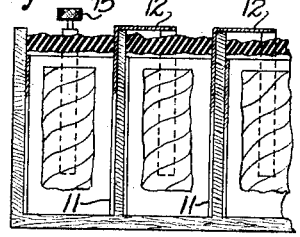 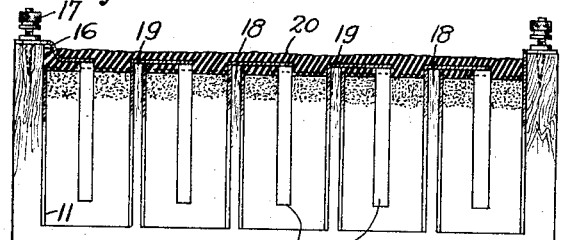
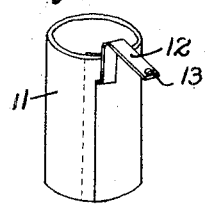 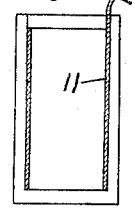 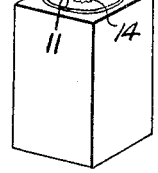 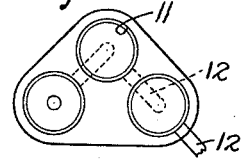
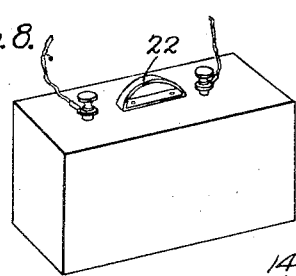 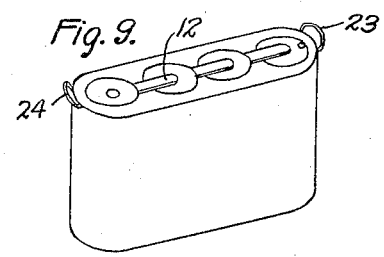
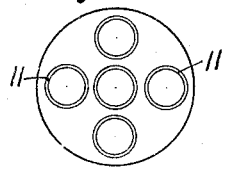 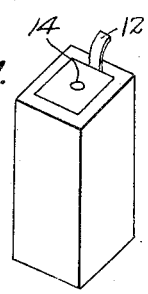 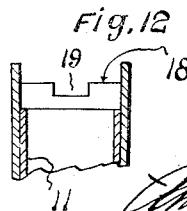
INVENTOR
John Smith
BY
ATTORNEY Patented Mar. 29, 1927.

1,622,402

UNITED STATES PATENT OFFICE.

JOHN SMITH, OF BROOKLYN, NEW YORK.

DRY CELL OR BATTERY.

Application filed September 9, 1921. Serial No. 499,444.

The object of this invention is to improve the construction of dry cells, or batteries of cells, or batteries as they are commonly called, and to produce a cell or battery of such simple and practical construction as to greatly reduce cost, through saving of materials and labor and produce a battery of long shelf life, and greater efficiency and one that owing to its solid, rugged construction will be waterproof and not affected by climatic changes.

In the past it has been the common practice to construct each cell with a zinc cup comprising a soldered or drawn cylinder having a bottom and into which the electrolyte or active material is placed. The carbon or positive element is centrally disposed in the zinc cup. In this construction the cup or container must be made of a zinc sufficiently heavy to support the cell at all times, as the zinc container serves the double purpose of a containing jar and an electrode and as I have discovered that only from one-tenth to one-sixth of the zinc is used up or consumed during the life of the cell, the required strength makes it necessary to provide a zinc cup of ninety per cent more zinc than is electrically required.

Because of the electrical requirements of such a small mass of zinc an object of my invention will be to construct a cell wherein but a very thin sheet of zinc may be employed as in my construction the zinc does not serve as the container and therefore need not be of such thickness and strength as to withstand all of the stresses of use.

Another object of my invention is the formation of batteries of cells as a single unit. In the past cells have first been constructed complete and have thereafter been assembled in containers, the required number of cells being placed in each container, the spaces between the cells filled with sand, saw-dust, pieces of wood, hot pitch or paraffin. In my construction the cells are formed integral with the container, in other words the container becomes an important part of each cell.

Another advantage of my invention resides in the fact that where in the ordinary cell the bottom must be insulated to prevent short circuiting or polarization of the cell, my construction makes it possible to omit the bottom of the cup greatly simplifying the construction by the saving of zinc, solder and labor.

A further object of the invention is to produce a battery of cells that can be constructed as a unit all cells being formed simultaneously, thus materially shortening the time consumed in the construction of a battery.

With these and other objects in view, the following is what I consider the best means of carrying out this invention and the accompanying drawing should be referred to for a complete understanding of the specification which follows:

In the drawing:

Fig. 1 is a plan view of a battery of cells, in this figure the cells are connected in multiple.

Fig. 2 is a fractional, sectional view of a battery having surface connections.

Fig. 3 is a sectional view of a battery of cells having sub-surface connections.

Fig. 4 is a perspective view of a single zinc member.

Fig. 5 is a sectional view of a single cell.

Fig. 6 a perspective view of a single cell complete.

Figs. 7, 8, 9, and 10 show different groupings of cells, Figs. 8 and 9 being in perspective and Figs. 7 and 10 being plan views.

Fig. 11 shows an oblong cell and oblong container made according to my invention.

Fig. 12 shows a fractional and sectional view of a single cell.

Similar reference numerals indicate like parts in all the figures where they appear.

In the construction of my dry cell or battery I employ a block of wood, rubber, fibre or any other suitable material and into this block I cast, drill, punch or mold one or more wells or recesses of the desired diameter, depth and form.

If wood is employed in the construction of my battery it should be waterproofed in any desirable manner by submerging in boiling oil or by the use of parafin, pitch, asphaltum or any other suitable substance, that will resist the acid or electrolyte employed in the formation of the cells and it will be understood that I may employ a block or base member of any size providing it with any number of wells or recesses, which wells or recesses may be arranged in any suitable manner or design.

In each well or recess I place a form or cylinder of zinc, both ends of which are open and if this member is, or these members are formed from strips of zinc or other desirable metal, the adjacent or over-lapping edges may or may not be soldered or lock seamed as desired.

Along one edge and at any suitable distance therefrom I produce a saw-kerf or slit extending less than the entire length of the zinc element and producing the tongue or ribbon shown in Fig. 4, where the cylinder is indicated by the reference character 11 and the ribbon or tongue by the reference character 12, and I prefer that the tongue be provided with a perforation as shown at 13.

The carbon member 14 is centrally disposed in each cell and the filler for the cell may be of any known material or any material found suitable and desirable. I may utilize sand and plaster, blotting paper or paper pulp or the bag or bobbin construction.

The bobbin or bag type of cell or battery when used with my invention is made up as follows:

The zinc element is placed in the recess or well provided in the block container, then the bag or bobbin containing the carbon with the manganese-graphite mixture is set in the center of the zinc element, then the surrounding space between the bag and the zinc walls are filled in with a mixture containing the electrolyte in paste form about the consistency of cream, that will in a short time form into a stiff jelly and remain semi-fluid, after which the top of the cells can be covered in the usual manner as shown, and after connections are made and the cells sealed, the battery is ready for use.

Some mixtures are made up of plaster of Paris, starch and electrolyte. Other mixtures may be used. Sal ammoniac, chloride of calcium and calcined magnesia forms a paste that will in a few days form a jelly, also sal ammoniac, zinc chloride, oxide of zinc, and water will also form a paste that will become semi-solid and of proper consistency in a few hours.

There are many other cold paste solutions made, that will bring about the required results, but different mixtures of sal ammoniac and zinc chloride, calcium solutions are generally used and from practical experience have given the best results.

For the organic materials used in making the cold paste electrolyte, I have found from experience and research that materials rich in starch give the best results, potato starch, corn flour, sago, gelatine, rice flour glue, cereals and gums, when mixed in proper proportions with the salts and water form a solution that will jelly to the proper consistency when used in a cell.

The connections between cells in a battery may be surface connections or sub-surface connections and are made by extending the zinc tongue 12 of one cell to the carbon member of the next cell, a drop of solder being deposited into the perforation 13 to secure the zinc to the metal cap of the carbon element. To the last zinc a terminal may be secured by soldering or otherwise as shown at 15 and this terminal may be provided with a pin for securing it to the body of the container to obviate the possibility of the zinc tongue being broken off by continuous flexing.

In this construction I would secure a metallic strip 16 to the first carbon element of the series providing a terminal 17 which may be a binding post and which may be similar to the binding post 15 described.

In the construction shown in Fig. 3 the walls 18 between batteries or cells as I prefer to refer to them, are slotted as shown at 19 to allow the connections between cells to be made below the top surface of the container and when all of the cells are connected as shown, a suitable pitch material known as battery compound may be deposited upon each cell as shown at 20 and should be allowed to fill the slots in the members 18 to protect the connections.

As before set forth these batteries may be of any shape, may contain any number of cells and the cells connected in any suitable manner, in series, multiple, or series multiple or multiple series and I may provide carrying handles as shown at 21 in Fig. 1 and 22 in Fig. 8 or even the end rings or handles 23 and 24 in Fig. 9.

This type of cell or battery can be made up into all forms of zinc containers, square, oval, triangular or any shape that may be required for a particular service also the various type of cells or batteries used for flash light trade.

One greatest advantage found in my block principle in the construction of batteries of the bag type is that all the component parts of the battery can be assembled, the zinc element can be placed in the block container, the bobbin or bag can be placed in the zinc container, all connections made and binding posts set making a reserve battery. To make this battery active pour in electrolyte to the top of the bag, and when set to a stiff jelly the final seal can be placed on top of cells and the battery is ready for use.

The terminals may be of different construction as many terminals are known in the art.

The zinc connector may be the ordinary zinc connector now in use and other modifications may be made within the scope of the appended claims without departing from the principle or sacrificing the advantages of the invention.

Having carefully and fully described my invention what I claim and desire to obtain by Letters Patent of the United States is as follows:

1. As a new article of manufacture, a dry cell battery consisting of a block of water-proofed material having a plurality of cylindrical recesses formed therein and a dry cell built up in each said recess, one element of said cell directly upon the walls of said recess.

2. As a new article of manufacture, a dry cell battery consisting of a block of water-proofed material having a plurality of cylindrical recesses formed therein and a dry cell built up in each said recess, and having one of its elements directly upon the walls of said recess, said cells being connected in series and all said connections being below the plane of the upper edges of said block.

3. As a new article of manufacture, a dry cell battery consisting of a block of water-proofed material having a plurality of cylindrical recesses formed therein and a dry cell built up in each said recess with one of its elements in direct contact with the wall of said recess, one active element of each cell being supported directly upon the wall of each said recess.

4. A dry battery comprising a container formed of a solid block of wood having a plurality of recesses therein, a metallic member in each said recess and supported thereby, a flexible tongue formed integral with each metallic member, a carbon member and electrolyte arranged in said metallic member and means for securing each said tongue to the next successive metallic member.

5. A galvanic cell assembly comprising a depolarizing cathode, an anode, an electrolyte in operative relation, and a block of insulating, electrolyte-proof material having a cavity, the walls of which retain the electrolyte and electrodes, the electrolyte being in direct contact with at least a portion of said walls.

6. Method of making a galvanic cell, comprising forming a cavity in a block of insulating material and assembling electrolyte, an anode, and a cathode, in operative relation in said cavity.

7. The method of making a plural cell battery which comprises: introducing into each cell-cavity of a preformed plural cell-cavity container a zinc shell, an electrolyte, and a core of depolarizing mixture provided with an electrode, electrically connecting the cells thus formed, and sealing the container.

8. The method of making a plural cell battery which comprises: forming a plural cell-cavity container, introducing into each cell-cavity a quantity of gelatinizable electrolyte, a zinc shell, and a core of depolarizing mixture equipped with an electrode, electrically connecting the cells, and pouring a sealing compound into the space above the cells.

Signed at the city, county and State of New York, this 2d day of September, 1921.

JOHN SMITH.